May 17, 1949.    M. G. CROSBY    2,470,240
LIMITING DETECTOR CIRCUITS
Filed July 31, 1945    6 Sheets-Sheet 1

INVENTOR.
Murray G. Crosby
BY
ATTORNEY.

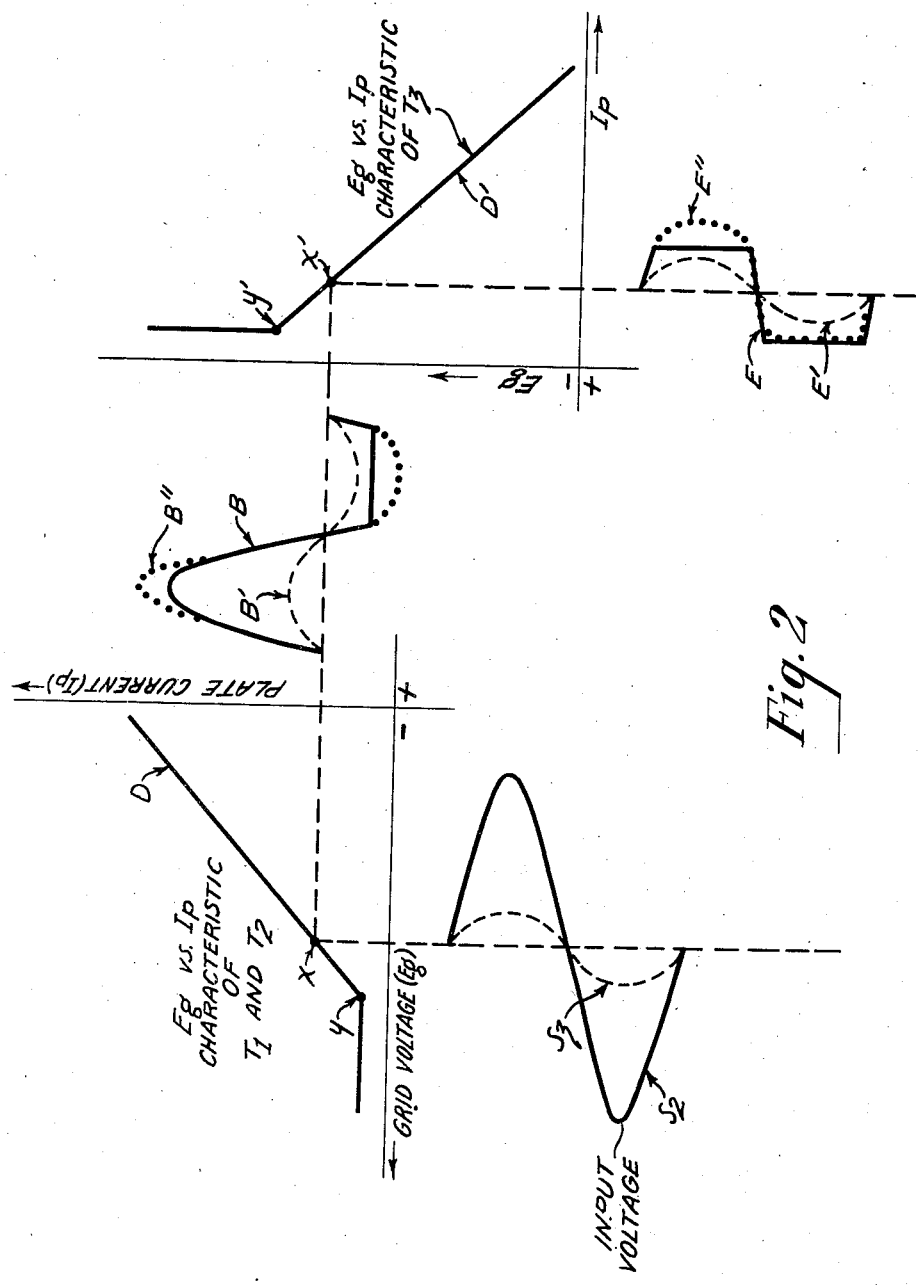

May 17, 1949.                    M. G. CROSBY                    2,470,240
                          LIMITING DETECTOR CIRCUITS
Filed July 31, 1945                                           6 Sheets-Sheet 4
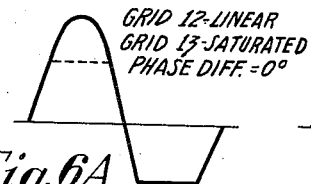
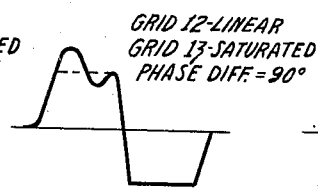
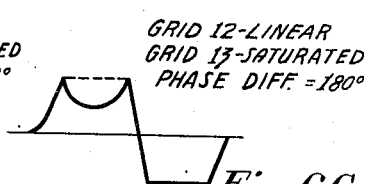
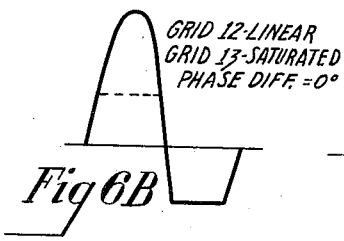
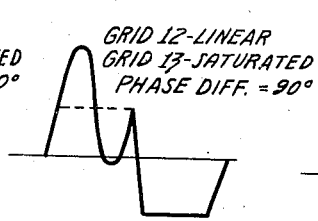
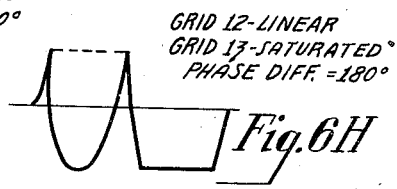
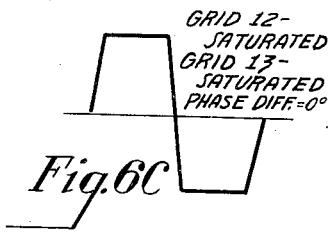
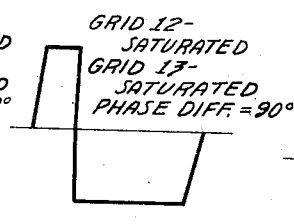
INVENTOR
*Murray G. Crosby*
BY *H.S. Grover*
ATTORNEY May 17, 1949.    M. G. CROSBY    2,470,240
LIMITING DETECTOR CIRCUITS
Filed July 31, 1945    6 Sheets-Sheet 5

INVENTOR
*Murray G. Crosby*
BY
ATTORNEY

May 17, 1949.   M. G. CROSBY   2,470,240
LIMITING DETECTOR CIRCUITS
Filed July 31, 1945   6 Sheets-Sheet 6

INVENTOR
Murray G. Crosby
BY
ATTORNEY

Patented May 17, 1949

2,470,240

UNITED STATES PATENT OFFICE 2,470,240

LIMITING DETECTOR CIRCUITS

Murray G. Crosby, Upper Montclair, N. J., assignor to Radio Corporation of America, a corporation of Delaware Application July 31, 1945, Serial No. 608,018

17 Claims. (Cl. 250—27)

My present invention relates to improved detectors of radio frequency waves, and more specifically to detectors capable of limiting amplitude variations.

In my U. S. Patent No. 2,276,565 granted March 17, 1942, I disclosed and claimed limiting amplifier circuits which utilized a pair of electron discharge devices whose cathodes were so coupled together that a variation in the electron discharge current of one of the devices varied the discharge current of the other device. The signal wave was applied to the grid of the first device, while the grid of the second device was at a relatively fixed potential for alternating currents. The first device was effective for negative grid limiting of the negative half cycles of the input signals, while the second device, due to phase reversal of its grid to cathode voltage with respect to the grid to cathode voltage of the first device, was effective for negative grid limiting of the positive half cycles of the input signal wave.

The general circuit was shown employed as a detector of frequency modulated signals in my U. S. Patent No. 2,263,615 granted November 25, 1941; more particularly in Figs. 4, 5 and 8 thereof. In the latter patent the separate control grids of the cathode-coupled electron discharge devices had signal wave voltages applied thereto in phase quadrature relation at resonance. Variations from the resonance relation were translated in the output circuit of the second device as detected voltage variations.

In my last-mentioned detector circuit the arrangement of the two triodes functioned in the manner of a linear modulator which had characteristics between its respective triode grid and plate circuits such that both grids were adjusted to the linear portions of the respective characteristics. The phase-shifted signal input voltage applied to the input triode grid was large enough to produce saturation of the characteristics of both triodes. The non-shifted signal voltage was applied to the output triode grid, but with an intensity to produce linear operation. Hence, the amplitude of detected output voltage which occurred when saturation existed varied as the grid voltage of the output triode device was varied.

It is an important object of my present invention to provide detection systems of the aforesaid cathode-coupled type, wherein phase differences between the voltages of the two grids may be detected regardless of whether only one grid is saturated or both grids are saturated. By the term "saturation" is meant sufficient applied signal intensity to produce true limiting, or clipping, action.

It is another important object of my present invention to provide a novel method of translating angle modulated waves including the steps of deriving a pair of signal voltages of like frequency from the waves, successively subjecting the waves to clipping of successively opposite halves of the separate waves, and combining the clipped waves to produce a resultant square wave whose shape is a function of the angle modulation of the waves to be detected.

Another important object of my invention is to provide a detection system for angle modulated waves; the system essentially comprising three electron discharge devices whose cathodes have a resistor common to the space current paths of the three devices, the output voltage being derived from the last of the devices, and there being applied to the respective input devices waves of a common frequency whose phase differences are to be detected.

Another object of my present invention is to provide a general method of converting an angle modulated carrier wave into a variable-mark square wave of constant frequency.

A more specific object of my invention is to provide self-limiting detection systems of various forms of construction, wherein frequency modulation (FM) signals are detected with immunity from amplitude modulation (AM) effects on the received carrier signals, there being utilized a basic method of translating the FM signals into a pair of signal voltages having phase differences in accordance with the frequency modulation of the signals, and wherein the phase-variable voltages are employed to produce variable-mark square waves from which is derived an output voltage representative of the frequency modulation.

Still more specific objects of my invention are to improve detector circuits for AM, FM or PM (phase modulated) carrier waves, and more specifically to provide such detector circuits in an economical and reliable manner.

Still other features of my invention will best be understood by reference to the following description, taken in connection with the drawings, in which I have indicated diagrammatically several circuits organizations whereby my invention may be carried into effect.

In the drawings:

Fig. 2 is a graphical analysis of the functioning of the system of Fig. 1;

Figure 1:
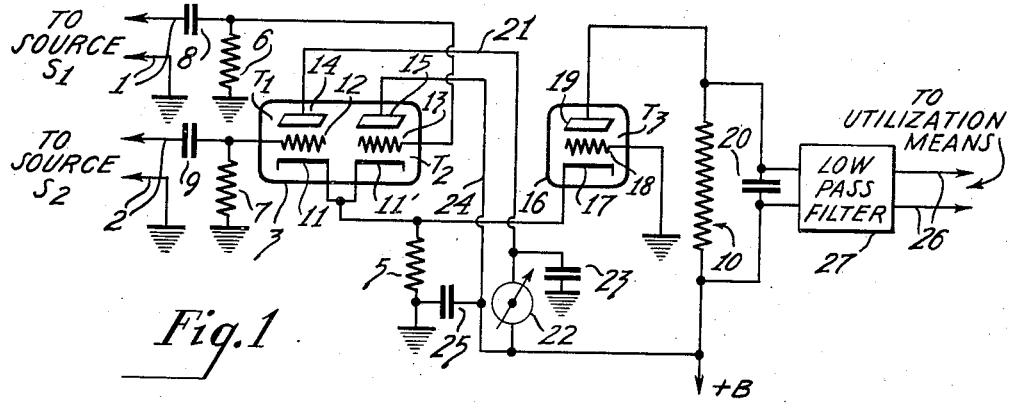
Fig. 1 shows a circuit diagram of one embodiment of the invention.
Figure 4:
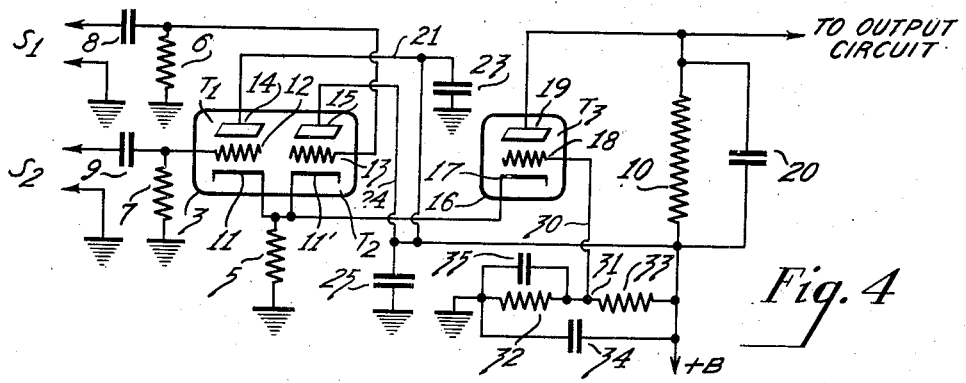
Figure 5:
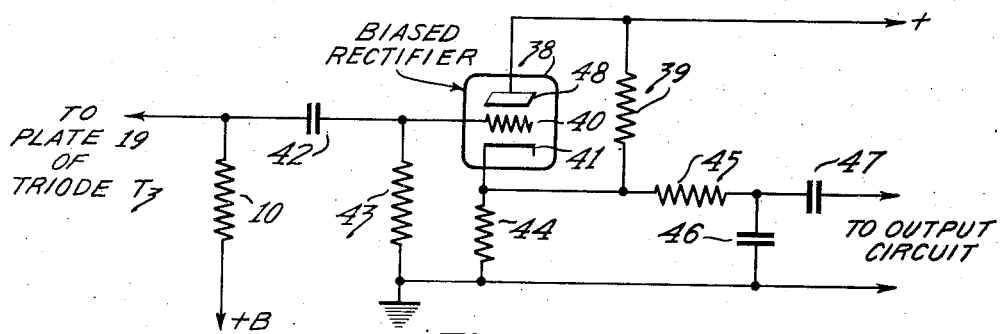
Figure 3:
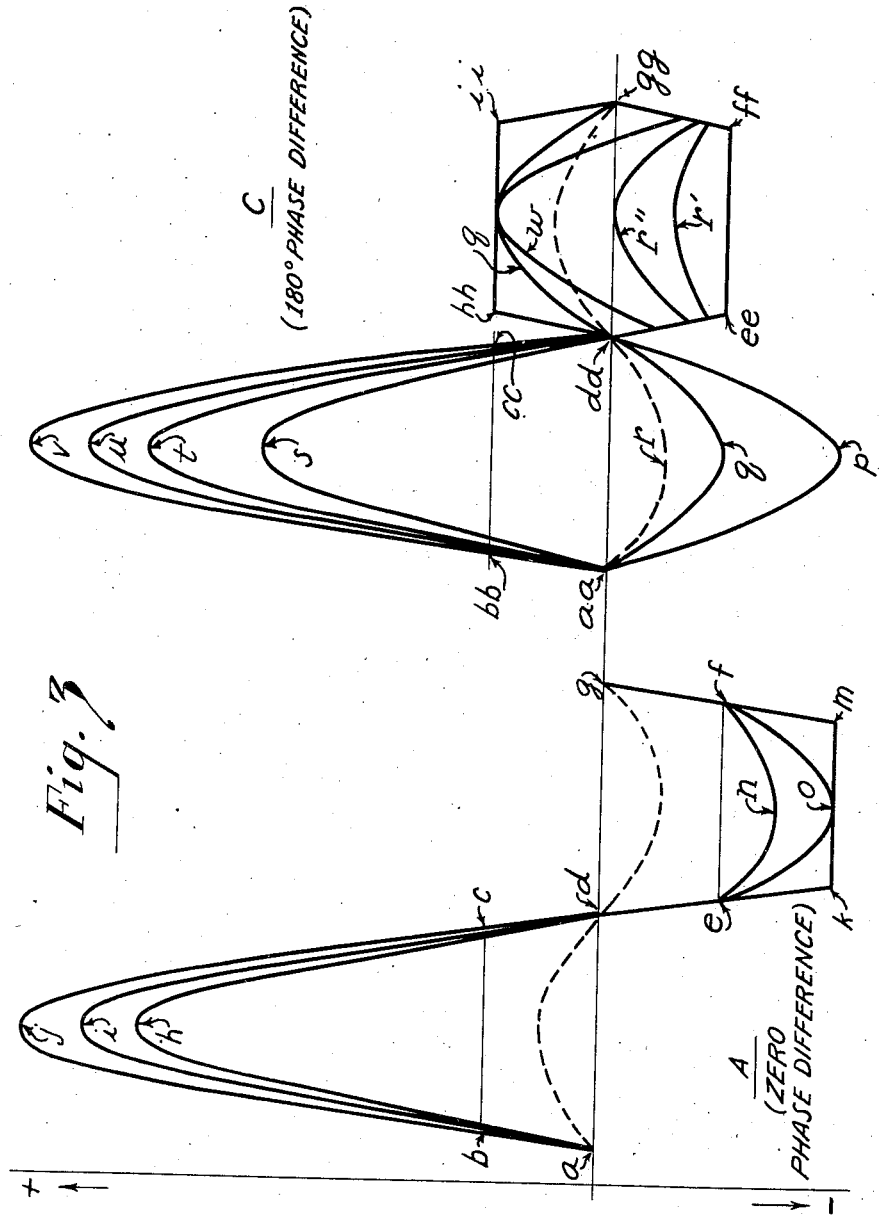
Figure 8:
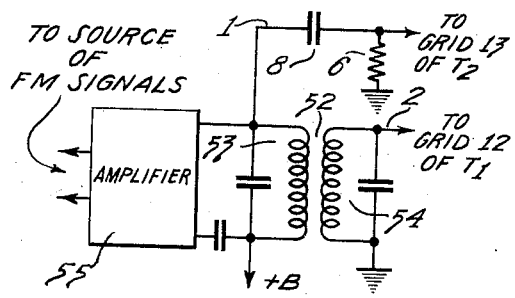
Figure 8A:
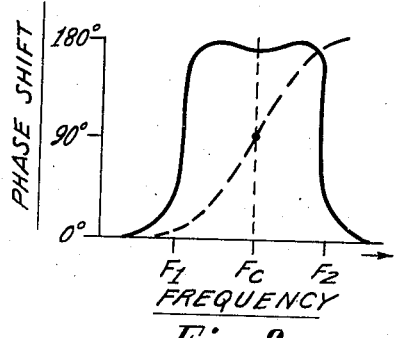
Figure 8B:
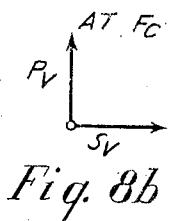
Figure 8C:
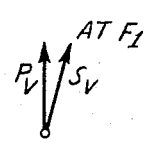
Figure 8D:
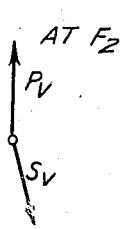
Figure 9:
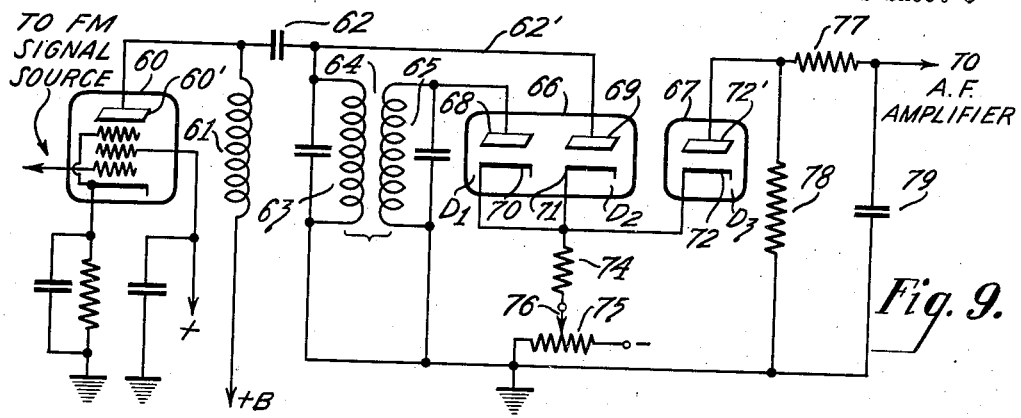
Figure 10:
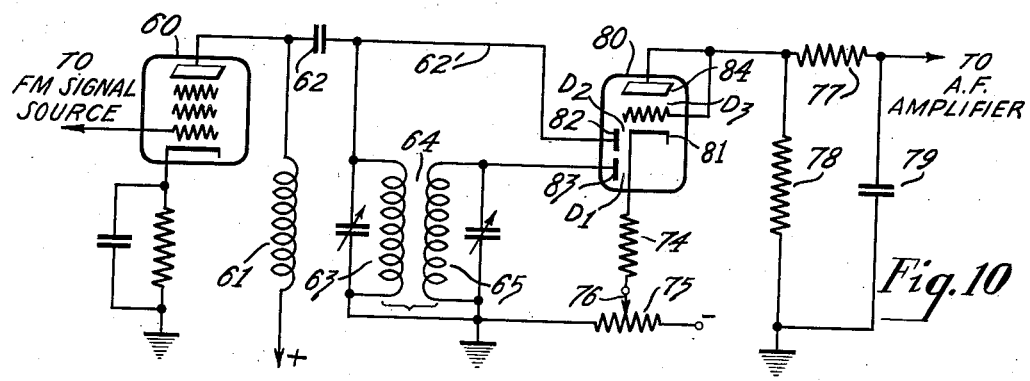
Figure 11:
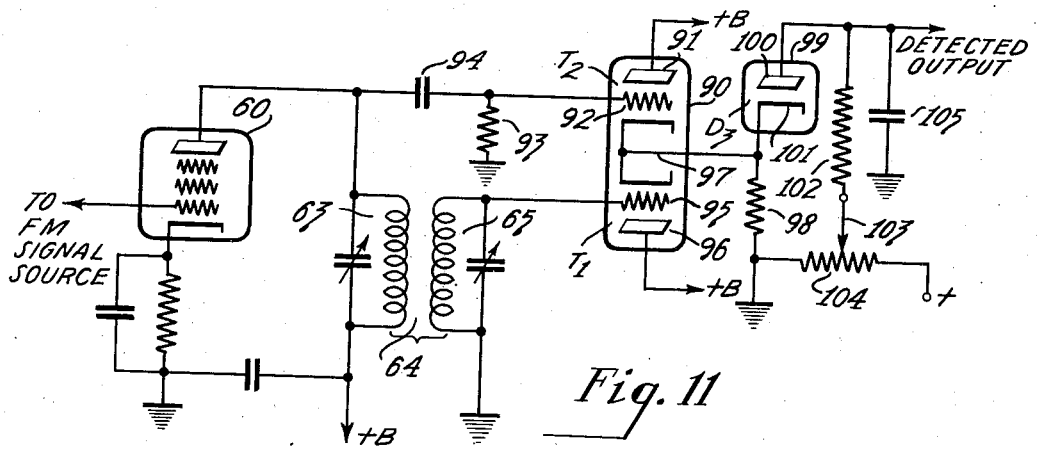

Fig. 3 graphically shows the operation of the detector system of Fig. 1 for input waves of various magnitudes and phases;

Figs. 4 and 5 shows respectively different embodiments of the invention;

Figs. 6A to 6I inclusive show respectively different square wave forms produced under different operating conditions of the invention;

Figs. 7a to 7d inclusive show respectively different square wave forms produced for different phase differences with the input grids saturated;

Fig. 8 shows one embodiment of a discriminator network which may be employed with the input triodes of Fig. 1;

Fig. 8a shows the response curve of the discriminator of Fig. 8;

Figs. 8b, 8c, 8d show respectively different phase relations for the primary and secondary vectors of the discriminator of Fig. 8; and Figs. 9, 10, and 11 show respectively different modifications of the embodiment shown in Fig. 1.

Referring now to the accompanying drawings, wherein like reference characters in the several figures designate similar circuit elements, I have shown in Fig. 1 a pair of electron discharge devices $T_1$ and $T_2$. These electronic devices are entirely separate so far as their electron streams are concerned, but have been shown as enclosed within a common tube envelope. While a double triode type of amplifier tube 3 has been shown, it is within the scope of my invention to use entirely separate triode tubes, if desired. It should be further understood that I intend by the use of the term "tube" to mean a structure including an electron emission electrode and an anode, with means for controlling an electron stream between said electrodes regardless of whether more than one electron section is included within the tube envelope. Furthermore, it is to be clearly understood that while I have shown triodes in Fig. 1, the functions thereof may readily be performed by diodes as will be shown in later figures.

In order to simplify the explanation of the functioning of the present invention, it is assumed that the control electrode or grid 12 of the input triode $T_1$ has applied to it high frequency waves from input connections 2. Similarly, it is assumed that the input connections 1 apply high frequency waves of the same frequency to the input grid 13 of triode $T_2$. Without specifying the specific nature of the sources of the waves, let it be assumed that the waves $S_1$ and $S_2$ are subject to phase differences. The essential purpose of the system of Fig. 1 is to provide output voltages which are representative of the phase differences between the waves $S_1$ and $S_2$. The input triode $T_1$ has its grid 12 connected to the high potential terminal of the input connections 2 through the coupling condenser 9, the grid leak resistor 7 connecting grid 12 to ground. It is to be clearly understood that an actual ground connection may not be necessary, the ground representation signifying merely a point of zero signal potential.

The grid 13 of triode $T_2$ is coupled to the high potential terminal of input connections 1 through the coupling condenser 8, grid leak resistor 6 connecting grid 13 to ground. The respective cathodes 11 and 11′ of the triodes $T_1$ and $T_2$ are connected in common to the ungrounded end of cathode resistor 5, the latter being unbypassed. The anode or output electrode 14 of the input triode $T_1$ is connected by lead 21 and the milliammeter 22 to the +B terminal of a suitable direct current source. The lead 21 is bypassed to ground by condenser 23. The anode or output electrode 15 of triode $T_2$ is connected by lead 24 to the +B terminal, and the lead 24 is bypassed to ground for high frequency currents by condenser 25.

As will be shown in detail at a later point, there is developed across the common cathode resistor 5 a high frequency voltage which is caused by the conjoint flow of space current of both triodes $T_1$ and $T_2$ through resistor 5. These space currents are, of course, controlled by the high frequency voltages applied to the separate grids 12 and 13. The grid voltage ($E_g$) vs. plate current ($I_p$) characteristic of each of the triodes is the same, and the magnitude of resistor 5 determines the operating bias point on each characteristic. However, the magnitude of the high frequency voltage applied to each of grids 12 and 13 will determine whether the operation of the respective triode is "saturated" or "linear."

The high frequency voltage across resistor 5 is utilized to drive limiter, or clipper, tube 16. This tube is shown as a triode $T_3$ by way of illustration. Here, again, a diode may be used instead of a triode. The cathode 17 of tube 16 is directly connected to the ungrounded end of cathode resistor 5, while the grid 18 is grounded. The anode or output electrode 19 is connected through output, or load, resistor 10 to the +B terminal, while high frequency bypass condenser 20 shunts resistor 10. There is developed across resistor 10 a voltage which is representative of phase differences between input waves $S_1$ and $S_2$. The output connections 26 may be coupled to the resistor 10 through a low pass filter 27 so as to transmit to a subsequent utilizing means the voltage representative of the differences between waves $S_1$ and $S_2$, while rejecting all undesired high frequency components. For example, if the phase differences between $S_1$ and $S_2$ correspond to audio frequency signal modulation the filter 27 would be an audio frequency filter, and the voltage variations derived from resistor 10 would be the audio frequency signals.

It is pointed out that the $E_g$ vs. $I_p$ characteristic of tube 16 is similar to those of triode sections $T_1$ and $T_2$. The cathode resistor 5, being common to the space current path of triode $T_3$, will determine the operating bias of the latter. In order to explain clearly the electrical relations existing in the various portions of the system shown in Fig. 1, reference is made to Fig. 2 which shows idealized curves representing the various electrical effects in the different sections of the system. There will first be explained the relations existing in the system in the case where waves are applied to input connections 2, but no waves are applied to the input connections 1. In other words, the high frequency voltage across resistor 5 is assumed to be due solely to high frequency voltage variations applied to grid 12. It is, further, assumed that the magnitude of the waves $S_2$ applied to grid 12 is sufficient to saturate the grid.

In Fig. 2 the sinusoidal input voltages $S_2$, assumed to be applied to grid 12 of triode $T_1$, causes variation in plate current flow of the triode $T_1$ with respect to the operating bias point $x$. The zero axis of wave $S_2$ passes through the point $x$ on the typical $E_g$ vs. $I_p$ characteristic curve of triode $T_1$. The characteristic curve is idealized, and curvature at the cut-off bias point $y$ is disregarded. The magnitude of cathode resistor 5 is chosen to be of such value that the characteristic curve D is representative of the changes in plate current produced by changes in grid voltage, the normal operating bias in the absence of applied voltage being at point $x$. It is to be understood that curve D is representative of the characteristic of triode $T_2$ as well. When the input voltage $S_2$ passes through the positive half of its cycle (i. e., causes the grid voltage to become less negative) then linear amplification of the positive half cycle occurs.

On the negative half cycle of the input wave $S_2$, the grid will be biased negatively to reach cut-off point $y$ of the characteristic curve D. It is, again, emphasized that the magnitude of the input wave $S_2$ is such as to saturate the grid 12. In other words, on the negative half cycles of wave $S_2$ the grid 12 is changed in voltage in a negative polarity sense up to, and beyond, point $y$. It will, therefore, be seen that the input wave $S_2$, limited by negative cut-off at the lower bend of the characteristic curve D, provides the solid line curve B representative of the voltage developed across cathode resistor 5 due to the input wave $S_2$. From the curve B, whose horizontal axis passes through operating bias point $x$, it is seen that the cathode voltage wave has a positive half cycle which is unlimited and a negative clipped half cycle due to the limiting on the negative half cycle of input wave $S_2$.

The solid line curve D' represents the $E_g$ vs. $I_p$ characteristic curve of the triode $T_3$. Here, again, the characteristic curve is idealized, and the point $x'$ represents the operating bias point of the triode $T_3$. It will be noted that the characteristic curve D' has been shown related to the wave form B so that the zero axis of the curve B passes through the operating bias point $x'$. The point $y'$ represents the cut-off point of characteristic curve D'. Since the cathode resistor 5 provides the normal operating bias for triode $T_3$ the characteristic curve of the tube is substantially similar to curve D, although this is not necessarily true.

The output voltage of triode $T_1$, being developed across cathode resistor 5, is fed to the cathode 17 of triode $T_3$ instead of to the grounded grid 18. Accordingly, the positive half cycle of wave form B, which is now the input wave for the triode $T_3$, causes the cathode voltage 17 to become increasingly positive relative to the grounded grid 18. This is equivalent to biasing the grid 18 in a negative polarity sense relative to the normal operating point $x'$. The result is a limiting, or clipping, of the positive half cycle of the input voltage of triode $T_3$.

The negative, or clipped, half cycle of wave form B is linearly amplified along the characteristic curve D'. The grid is effectively biased in a less negative sense relative to operating point $x'$ in response to the negative half cycles of wave form B. As the cathode 17 is varied less positively in voltage, in accordance with the clipped wave form of curve B, the output voltage wave form E across resistor 10 will have a correspondingly clipped positive half cycle.

Solid line curve E, whose zero axis passes through normal operating bias point $x'$ of curve D', is representative of the wave form of the output voltage developed across resistor 10. The wave is a symmetrically limited square wave. Due to the identical arrangement of triodes $T_1$ and $T_2$ the clipped wave form E will be secured from the sinusoidal input wave $S_2$, regardless of whether the latter is applied to grid 12 or grid 13. The wave form E will exist with a pure resistance 10 in the output circuit of $T_3$. This is the case when condenser 20 is removed, since the condenser bypasses radio frequency components.

There will now be considered the nature of the output wave form when the input wave applied to one of grids 12 or 13 has a magnitude incapable of saturating the grid. In other words, the input wave $S_2$ is assumed to have the magnitude represented by the dash line curve $S_3$. The input wave $S_3$ will obviously be linearly amplified on both halves of each cycle, since the negative half cycles are not capable of reaching the cut-off point $y$. Hence, the wave form B' (shown in dash line) represents the cathode voltage developed across resistor 5. The cathode 17 will be varied in voltage in accordance with wave form B', and the resultant wave form across output resistor 10 may be represented by the dash line curve E'. The resultant output voltage is, as expected from linear amplification, an unlimited copy of input wave $S_3$. Here, again, the wave $S_3$ could be applied to either of grids 12 or 13, and still produce across resistor 10 the output wave form E'.

In accordance with the general and basic concept of my invention, there may concurrently be applied to grids 12 and 13 input waves of like frequency. The magnitudes of these input waves, however, may be such as to saturate the grids, or only one of them may saturate an input grid while the other provides linear operation. Further, the phase relation between the input waves may be in-phase, or any desired phase relation. In general, as will be explained below in detail, with both grids 12 and 13 saturated, the detected voltage across output resistor 10 will be proportional to the phase differences between input waves $S_1$ and $S_2$. For example, FM signals may be concurrently limited and detected in this way. Again, with one of grids 12 and 13 saturated and the other operated linearly, the detected output voltage across resistor 10 is proportional to phase and amplitude modulation on the waves applied to the linearly-operated grid. For example, PM waves may be detected in this way, with or without carrier-exaltation, or AM waves may be detected with carrier-exaltation.

Before considering in detail the various possibilities of my present invention, there will first be analyzed the relatively simple situation where one of the input grids is saturated and the other input grid is driven linearly. Referring to Fig. 2, assume that input wave $S_2$ is applied to grid 12 with a magnitude such as to saturate the grid. The input wave $S_1$ applied to grid 13 is assumed to have a magnitude and wave form similar to $S_3$ of Fig. 2. The waves $S_1$ and $S_2$ are assumed to be of the same frequency and to have an in-phase relation. There will be developed across cathode resistor 5 voltages due to these input waves. These cathode voltages will, of course, have the wave forms B and B', since, as previously explained, each input wave affects its respective input triode independently.

Now, the effect of the positive halves of wave forms B and B' will be to provide across cathode resistor 5 the resultant positive half-cycle voltage represented by dotted curve B''. The clipped negative half-cycle of curve B and the unlimited negative half-cycle of curve B' combine to provide the dotted resultant, negative half-cycle of wave form B''. In other words, the resultant dotted curve B'' is secured by adding curves B and B'. The input wave B'' applied to cathode 17 of triode $T_3$ will produce the resultant output wave form E'' shown dotted. It will be seen that the negative half-cycle of curve B'' has been linearly amplified by triode $T_3$, but that the positive half-cycle has been clipped due to cut-off point $y'$. Hence, the negative half-cycle of output wave E'' is co-extensive with the clipped negative half-cycle of wave form E. Obviously the form of output wave E'' is a function of the phase difference, or relation, between input waves $S_2$ and $S_3$. Furthermore, it should be apparent that the shape of resultant output wave E will be different for the in-phase relation of waves $S_2$ and $S_3$ for the case where both waves are of "saturatable" magnitude.

In Fig. 3, I have depicted the operation of the detector system of Fig. 1 when input waves are applied to the input grids 12 and 13 of various magnitudes and phase relations. The respective groups of wave forms indicated at A and C of Fig. 3 show the wave shapes for the respective conditions of zero and 180° phase difference between the input voltages $S_1$ and $S_2$ of Fig. 1. As previously stated, there are two conditions to consider, viz., the case where one grid is linearly driven while the second grid is saturated (the relation illustrated by curves $S_2$ and $S_3$ of Fig. 2), and the case where both grids are saturated.

Considering now the first of these cases, it is pointed out that a practical and simple example of such detection would be in carrier-exalted AM signal reception. Assume, for example, that an AM signal is applied to grid 12 of Fig. 1 with a magnitude to provide linear amplification at $T_1$, while to grid 13 there is applied the filtered carrier of the AM signal. The carrier has its sidebands substantially removed, and its magnitude is relatively greater (i. e., exaltation) than in the AM signal to an extent such as to saturate grid 13. The filtered carrier and AM signal are in phase, i. e., there is zero phase difference between them. This is obviously the situation depicted by curves $S_3$ and $S_2$ of Fig. 2. As shown in the latter figure, in the absence of input wave $S_3$ the wave form of the voltage across cathode resistor 5 due to $S_2$ has the shape B. Hence, in Fig. 3 the curve $a, b, h, c, d, e, f, g$ denotes the form of the voltage wave across cathode resistor 5 due to solely the saturating filtered carrier voltage at $S_1$ in Fig. 1. The wave form of the resultant output voltage across resistor 10 would then be represented by curve $a, b, c, d, e, f, g,$ (see curve E of Fig. 2).

If, now, the AM signal is applied to grid 12, there will be produced across cathode resistor 5 a linear reproduction of the signal voltage (represented by dash curve $a, d, g$ in Fig. 3). The resultant cathode voltage is depicted by curve $a, b, i, c, d, e, n, f, g$ (compare to dotted curve B'' of Fig. 2). The resultant output voltage across output resistor 10 is represented by curve $a, b, c, d, e, n, f, g$; the phase reversal effected by output triode $T_3$ has been neglected. It will be observed in Fig. 2 that the output wave E'' is reversed in phase relative to the curve $a, b, c, d, e, n, f, g$. The latter output wave form is redrawn in proper phase relationship in Fig. 6A.

It should now be clear that the output wave across resistor 10 is unsymmetrical due to the manner in which the two negative cut-off points $y$ and $y'$ limit the two halves of the wave. One half (the positive half of the input, or cathode, voltage) is limited after the combination of the two input waves from the input tubes. The other half is limited in a manner that allows the linear grid to add its component to the negative cathode swing of $T_1$. These negative cathode swings are applied as a positive grid swing for $T_3$, and are, therefore, linearly amplified. Consequently, the application of the AM signal to linear grid 12 has an effect on one half of the output wave, but not on the other half.

When the amplitude of the AM signal at grid 12 is varied (i. e., when the amplitude of dash curve $a, d, g$, of Fig. 3 is varied), the positive half of the cathode voltage takes on changes as portrayed by waves $h, i$ and $j$. When these are limited by the negative cut-off point $y'$ of $T_3$ the positive half of the wave form becomes substantially the same for all amplitudes, viz, $a, b, c, d$. Now, the negative half cycle of the input waves is separately limited by each of triodes $T_1$ and $T_2$. Since one triode ($T_1$) is not in the limiting condition, a segment of a sine wave such as shown by waves $n$ and $o$ is added to the square wave $d, e, f, g$. The form of the resultant output wave across resistor 10 produced in response to the cathode voltage wave $a, b, j, c, d, e, o, f, g,$ is illustrated by the wave form shown in Fig. 6B.

The variation in symmetry which is produced by the addition of the segment of the sine wave to one of the half cycles of the wave form, produces a change in average current in the output of the detector system. This change in average current is obtained by bypassing the alternating current component of the output wave by means of condenser 20 shunted across output resistor 10. The change in average current through resistor 10 is proportional to the amplitude of the voltage (AM signal) applied to linear grid 12. Hence, the amplitude modulation on the carrier is linearly detected, and there is derived from across resistor 10 the modulation signal voltage which is passed through low pass filter network 21 adapted to reject all high frequency components.

The group of wave forms C in Fig. 3 show the action of the detecting system when the AM signal at grid 12 is out of phase (180° phase difference) with the saturating carrier voltage at grid 13. Let it be assumed that the wave applied to the saturated grid 13 has a peak amplitude of $v$, while the AM signal applied to grid 12 has the peak amplitude $r$. The resulting wave form at the cathode resistor 5 will be a wave $u$ on the positive half cycles of the input waves. This resultant wave $u$ will be limited due to the negative cut-off $y'$ of triode $T_3$. Hence, the square wave form $aa, bb, cc, dd$ results on the positive half cycles. The negative half cycle, which is portrayed by $dd, ee, ff, gg$, in the absence of AM signal at grid 12, is indented or depressed from line $ee, ff$ to the line $r'$ due to the effect of the AM signal at linear grid 12. The resultant output wave form produced across resistor 10, in proper phase relation due to phase reversal by $T_3$, is depicted at Fig. 6G.

It will be apparent that when the amplitude of the AM signal at linear grid 12 is increased to value $q$, the positive half cycle on the cathode produces the wave form $t$ which is limited to line $bb, cc$. The negative half-cycle is now indented from line $ee, ff$ to wave form $r''$. A similar change is effected when the amplitude of the AM signal on the linear grid is increased to the value $p$. In this case the positive half cycle on the cathode resistor 5 produces the wave form $s$ which is limited to line $bb, cc$. The negative half cycle is now indented from line ee, ff to wave form w. The resulting wave form of the output voltage across resistor 10 is depicted by the curve in Fig. 6H, suitable phase reversal being effected. It can be seen that the average current through resistor 10 will vary with the dissymmetry produced so that amplitude modulation on the carrier of the signal applied to grid 12 will be detected. This average current is produced in the same manner as in the case of the in-phase application of the input waves.

If the input voltages applied to grids 12 and 13 (one saturating, the second linear) have a 90 degree, or phase quadrature, relation, then the respective wave forms of Figs. 6D and 6E are representative of the output voltage wave shapes. Fig. 6E differs from Fig. 6D in that the wave form of Fig. 6E illustrates the effect of increasing the amplitude of the AM signal applied to linear grid 12. For the condition of 90 degrees phase difference between the input waves, the added segment of the wave is equal to the indented segment so that the average current is not changed. The resultant output wave forms of Figs. 6D and 6E may be derived from a graphical analysis similar to that shown in Figs. 2 and 3. It is not believed necessary to repeat such analysis for the phase quadrature relation.

The detection of PM carrier waves is readily accomplished in the detection system of Fig. 1 by utilizing a normal or unmodulated 90 degree phase difference between the PM signal applied to linear grid 12 and the filtered carrier voltage applied to saturated grid 13. As those skilled in the art of radio communication know, a PM signal is produced by varying the phase of an unmodulated carrier in accordance with modulation signals. To detect a PM signal it is only necessary to compare the phase variations of the signals with a constant phase carrier which is in normal phase quadrature relation to the PM carrier in its unmodulated state. The resultant of the constant phase carrier and variable phase signal is a current whose amplitude variation is representative of the modulation of the carrier. Many methods are known for providing the phase quadrature reference carrier.

For example, there may be derived from the PM signals a filtered carrier by means of a sharply tuned piezo-electric crystal filter, the filtered carrier being phase shifted 90 degrees relative to the PM signals. It will be understood that the filtered carrier would be applied to grid 13 with a saturating amplitude, while the PM signal would be applied to grid 13 with a linear amplitude.

Considering the group of curves of Figs. 6A, 6D and 6G, or the group of curves of Figs. 6B, 6E and 6H, it will be seen that the output wave form across resistor 10 will vary in shape as the phase of the signal at grid 12 varies. Thus, as the phase difference is shifted from its normal 90 degree (relation between reference carrier and unmodulated signal carrier) position at Fig. 6E to the in-phase relation at Fig. 6B, the output wave form will change as shown at Fig. 6B. This results in an increase in average current through resistor 10 in a positive direction. If, now, the phase of the signal deviates to the out-of-phase (180 degrees) relation, the output wave form will be that of Fig. 6H. The average current through the output resistor decreases. For this type of PM detection any amplitude modulation is balanced out for the unmodulated condition, since for this condition an increase in amplitude does not change the equality of the areas under the opposite half cycles. The saturation of grid 13 by the filtered carrier makes it unnecessary to employ a carrier limiter subsequent to the carrier filter. It will be clear that the average current through output resistor 10 will be proportional to the phase variations of the signal at grid 12, and that the wave forms of Figs. 6B and 6H will represent the respective limits of phase deviation of the PM signal.

According to another aspect of my present invention, I may apply the input voltages to respective grids 12 and 13 with saturating amplitude. This method of operation has advantages in the detection of PM or FM signals. The saturation characteristics of these two grids 12 and 13 are, also, of such a nature that true limiting is effected. By applying to grids 12 and 13 the signal voltages whose phases are to be compared, it is possible to provide improved linearity of phase detection. The usual phase detector depends upon a vector combination of the two voltages to be detected for its linearity, or depends upon some other law which causes the detection to become non-linear for phase differences greater than approximately one radian, or 57.3 degrees. By utilizing the present invention there is provided detection of a constant-frequency, variable-dot modulation in which the length of the dot is directly proportional to the phase difference. Hence, the detection is linear out to phase differences of nearly 90 degrees. With both grids 12 and 13 saturated and limiting, the detected voltage across output resistor 10 will be proportional to the phase difference between the two voltages from sources $S_1$ and $S_2$ of Fig. 1.

Let it be assumed, then, that the sources $S_1$ and $S_2$ of Fig. 1 apply respective saturating voltages of the same frequency to the grids 12 and 13. The phase difference between the voltages are assumed to be zero. From Fig. 2 it will be seen that each input voltage will produce across cathode resistor 5 a wave form similar to solid line curve B. The resultant voltage effective at the cathode 17 of triode $T_3$ for the in-phase condition is portrayed in Fig. 3 by the wave form a, b, c, d, k, m, f, g. The output wave form across resistor 10 is depicted by the square wave shown in Fig. 6C. While from Fig. 2 it is seen that the cathode wave forms B are subjected to cut-off on the positive half-cycle, the clipped or limited negative half-cycle of B is linearly amplified. Hence, the voltage across resistor 10 has a wave form wherein the negative swings are twice the positive swings. This merely causes the average current through resistor 10 to shift to a new value when the saturating condition is reached on the two input grids 12 and 13.

As indicated in Fig. 3, the positive half cycle of the square wave is half the maximum amplitude of the negative half cycle. When the wave forms are redrawn in Fig. 6C, this dissymmetry is neglected since it is of no consequence. The square wave form is symmetrical, but the zero axis on the average is shifted to a value which is different than the resting, or permanent, plate current of the tube. In practice, this means that the plate current of the tube will be different for the condition of zero applied signal, than for the condition of the in-phase application of signals to both grids. Since both grids are operated continuously saturated, the fact that the current is different in the zero-signal and full-signal condition is of no consequence.

For the 90 degree phase difference between the input voltages from sources $S_1$ and $S_2$, the square wave of Fig. 6F is representative of the shape thereof. In this connection it will be seen that for the phase quadrature relation between the input waves there exists an amplitude progression from Figs. 6D to 6E to 6F. That is, the output wave form of Fig. 6F ultimately results when the voltage applied to grid 12 (linear at Fig. 6D) is progressively increased in amplitude until both quadrature-related input voltages are of saturating magnitude. The same relation exists in Figs. 6A, 6B, 6C and Figs. 6G, 6H and 6I. In the case of Fig. 6I there is represented the output wave form for the case where the input waves are both of saturating magnitude and are 180 degrees out of phase. Reference to Fig. 3, the group of curves denoted as C, shows that the resultant voltage at cathode 17 will have the wave form $aa$, $bb$, $cc$, $dd$, $hh$, $ii$, $gg$. The phase reversal due to output tube $T_3$ will cause the output wave to appear as in Fig. 6I.

As the phase difference between the two input voltages from sources $S_1$ and $S_2$ in Fig. 1 varies, the average current varies on either side of this average value by a form of constant-frequency, variable-dot keying. In Figs. 7a to 7d inclusive I have portrayed idealized output wave forms for respective cases of phase differences of zero degrees, 90 degrees, 45 degrees and 135 degrees. The 180 degree phase difference case is depicted in Fig. 6I. Figs. 7a to 7d, then, show the resulting output wave forms obtained for various phase differences (i. e., phase differences between sources $S_1$ and $S_2$ of Fig. 1) of input voltages, and for a condition of a high degree of limiting. As the phase difference between $S_1$ and $S_2$ of Fig. 1 varies from zero degrees to 180 degrees, the output square wave across resistor 10 changes its shape in accordance with the sequence shown by Figs. 7a, 7c, 7b, 7d and 6I.

The same sequence of wave forms is obtained for a phase shift between $S_1$ and $S_2$ in the opposite direction, viz., —45 degrees, —90 degrees, etc. The shunting of output resistor 10 by the bypass condenser 20, therefore, leaves current changes through the resistor which are proportional to the phase differences between $S_1$ and $S_2$. In the wave forms shown in Figs. 7a to 7d, as well as Fig. 6I, the horizontal axis of each curve is the average value, while the square wave curve is the alternating current component. In other words, if condenser 20 is removed the waves across output resistor 10 appear as square waves.

The function of shunt condenser 20 is to integrate the areas under the square wave curves. This function of a bypass condenser to integrate the areas of variable-dot, constant-frequency waves is well-known to those skilled in the art of radio communication. It is emphasized that the average current obtained through output resistor 10 with grids 12 and 13 saturated by $S_1$ and $S_2$, and giving the wave forms as shown in Figs. 7a to 7d, is proportional to the phase difference of the input voltages, and remains constant regardless of the variation of the amplitudes of the input voltages.

In actual experimental operation of a system of the type shown in Fig. 1, unmodulated carrier voltage was applied to one of the input grids 1 at a level which produced saturation. The other grid was linearly fed by the modulated signal. It was shown that detection was equally linear for the application of carrier-eliminated modulation to the signal grid as for the application of lower degrees of modulation. In other words, the desired carrier-exaltation effect was obtained that eliminates distortion encountered when the carrier fades. The triodes $T_1$ and $T_2$ may be provided by a tube of the 6SN7GT type, while the triode $T_3$ may be provided by a tube of the 6J5 type. Of course, the three triodes may be in separate tube envelopes. By way of specific illustration resistor 5 may be given a magnitude of about 3,000 ohms, while resistor 10 may have a magnitude of 250,000 ohms. Condenser 20 may be given a magnitude about 50 micromicrofarads for a maximum modulation frequency of 15 kilocycles. In general, the condenser 20 should have a reactance equal to the resistance of resistor 10 at the maximum modulation frequency. Condensers 25 and 23 are radio frequency bypass condensers. The milliammeter 22 indicates the strength applied to the signal grid 12, so that it may indicate carrier strength when the modulated carrier signal is applied to grid 12.

Figure 7A:
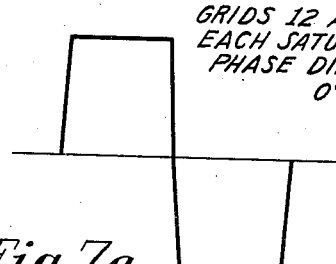
Figure 7B:
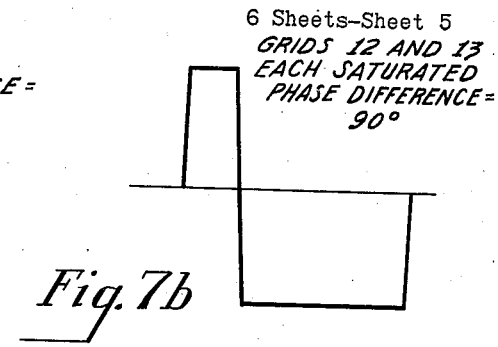
Figure 7C:
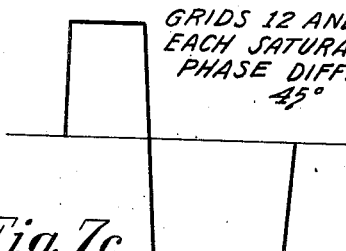
Figure 7D:
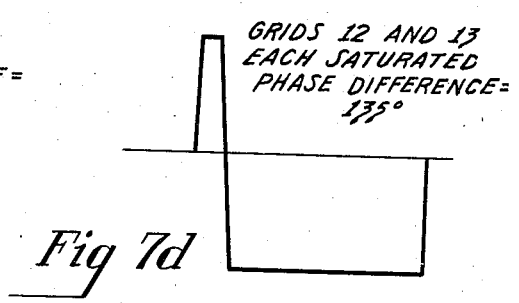

A study of the signal wave forms of Figs. 7a and 7d inclusive will show how the detection is more linear than with the usual type of phase detection. The length of the dot in the constant-frequency, variable-dot wave, or it might be called the per cent mark, is directly proportional to the phase differences. The average current through resistor 10 is directly proportional to the length of the dot so that the detection is linear for the complete range from zero degrees to 180 degrees, when the square wave is impaired by a change to a wave such as is shown in Fig. 6I. How near 180 phase difference can be detected linearly will depend on the degree of limiting which is secured. It is noteworthy that the usual phase detector becomes non-linear for phase differences exceeding about 120 degrees.

In Fig. 4 I have shown a modification of the the circuit of Fig. 1, wherein the control grid 18 of triode $T_3$ is given a positive bias with respect to cathode 17. In other words, instead of returning the control grid 18 of triode $T_3$ to the grounded end of cathode resistor 5, the control grid 18 is connected to a point of predetermined positive voltage on a voltage divider. In this modification the triode $T_3$ was of the 6SF5 type. In order to produce symmetrical limiting the grid 18 is connected by lead 30 to the point 31, which is the junction of resistors 32 and 33. Resistors 32 and 33 are connected in series from the +B lead to ground. Resistors 32 and 33 provide the voltage divider which supplies the requisite positive bias for grid 18, the voltage drop across resistor 32 being employed to provide a positive bias of about +11 volts for grid 18. The entire voltage divider is shunted by condenser 34 in order to bypass radio frequency currents, and condenser 45 shunts resistor 32 for the same purpose.

The fixed positive bias is applied to output tube 16 ($T_3$), because the 6SF5 type of tube cuts off at a lower negative voltage than the respective triodes $T_1$ and $T_2$ which are in a 6SN7GT dual triode tube. The grid 18 receives too much negative bias from the common resistor 5. In order to compensate for this, and yet take advantage of the higher gain of the tube 16, a positive bias is applied to grid 18. This restores the symmetry of limiting, and will result in a higher overall conversion gain of the detecting system.

In other respects, the arrangement of Fig. 4 is constructed in the same manner as the system shown in Fig. 1. Furthermore, the functions described in connection with Fig. 1, and the electrical relations between the various radio frequency voltages, are, also, the same. Another combination of tubes may require the application of a fixed bias to the grids 12 and 13 of the input triodes. This can be readily accomplished by connection of the low potential end of grid leak resistors 7 and 6 respectively to suitable points on the voltage divider 32, 33.

The bypass condenser 20 across output resistor 10 may be replaced by a rectifier network to provide the modulation signal voltage. In other words, the variable-mark waves generated in the system of Fig. 1 may be subjected to rectification as shown in Fig. 5. It has been explained in connection with the circuit of Fig. 1 that with both grids 12 and 13 saturated, the wave form across resistor 10 is represented by Figs. 7a to 7d inclusive for progressive phase differences. In the case of the square wave form the peak voltage remains constant, and the percent-mark varies. Under these circumstances it is more suitable to rectify the square waves to their half wave condition, and then integrate the half waves to produce an average current. Such a device is shown in Fig. 5, which employs a biased cathode-follower type of rectifier tube 38.

In Fig. 5 it will be understood that the output resistor 10 is arranged in the plate circuit of triode T₃, as shown in Fig. 1. The anode of triode 38 is indicated by numeral 48. The grid 40 is shown connected to the plate end of resistor 10 by means of the coupling condenser 42. The cathode 41 is connected through load resistor 44 to the grounded end of grid leak resistor 43. The plate 48 is connected to a source of positive voltage. The grid is biased normally to cut-off by virtue of the application of positive voltage to cathode 41, through resistors 39 and 44. This causes the triode 38 to clip the positive half waves of the applied square wave, and make them available across cathode resistor 44. The half waves are then passed through integration network comprising resistor 45 and shunt condenser 46. The network 45, 46 averages the intermediate, or radio frequency, half cycles to produce the modulation frequency component at the output condenser 47. The output circuit may be of any desired and suitable construction.

It has been previously pointed out that the system of Fig. 1 is readily adapted to provide detection of FM signal waves. It is only necessary to translate, or convert, the FM signal waves into a pair of signal voltages of the same frequency, but whose phase difference is a function of the frequency modulation of the received carrier. In Fig. 8 I have shown an illustrative conversion or translation network readily adapted for use with the input connections 1 and 2 of Fig. 1. Let it be assumed in Fig. 8 that the grids 12 and 13 of respective input triodes T₁ and T₂ are fed through a phase discriminator of the type shown in the figure. The discriminator consists of a transformer 52 whose primary circuit 53 is tuned to a predetermined operating frequency. The secondary circuit 54 is tuned to the same operating frequency as circuit 53.

The circuits 53 and 54 are magnetically coupled so as to provide a typical band pass response curve of the type ideally represented by the solid line curve shown in Fig. 8a. The input terminals of primary circuit 53 may be fed with amplified FM signals by means of amplifier 55, the latter being schematically represented. Amplifier 55 is not an amplitude limiter as is common in FM receivers, but is a normal signal amplifier. For example, the amplifier 55 may be the intermediate frequency (I. F.) amplifier of a superheterodyne receiver of the type normally employed for the FM broadcast band of 42-50 megacycles (mc.). Those skilled in the art of radio communication are well acquainted with the construction of such a receiver. In general, the FM signals in that band are transmitted from each transmitter with a frequency swing of ± 75 kc. At the receiver, however, the signal selector circuit will have a band width of 200 kc. so as to provide tolerance for assuring the transmission of the maximum frequency deviations of the signal. The FM band may be above 80 mc., if desired.

Assuming an I. F. value of 4.3 mc., it will be understood that each of circuits 53 and 54 will be tuned to the I. F. value of 4.3 mc., while the pass band width of the network 52 will be 200 kc. The high alternating potential side of circuit 53 is connected through the input connection 1 and coupling condenser 8 to the grid 13 of triode T₂, the grid leak resistor 6 being provided as shown in Fig. 1. The grid 12 of triode T₁ will be connected directly by input connection 2 to the high alternating potential side of secondary circuit 54. In other words, the low potential side of circuit 54 is grounded, and will, therefore, return to the grounded end of cathode resistor 5, as indicated in Fig. 1. Since the detection network is the same as shown in Fig. 1, it is unnecessary to repeat the circuit connections of Fig. 8.

In Fig. 8a, I have indicated the relation between phase shift of the voltage across secondary circuit 54 and changes in frequency of the applied signals. As stated before, the solid line curve represents the response curve of network 52. The dash line curve indicates the variation in phase shift of the secondary voltage as the signal changes in frequency above and below the center frequency F_c. The limiting upper frequency swing is indicated by F₂, while the limiting lower frequency swing is indicated by F₁.

Figs. 8b, 8c and 8d portray the vector relations between the primary and secondary voltages in Fig. 8 at respectively F_c, F₁ and F₂. It will, therefore, be observed that there will be applied to the respective grids 12 and 13 a pair of signal voltages whose phase relations vary as the frequency of the incoming signal deviates with respect to F_c, the carrier frequency of the wave. Thus, the frequency variation at the input terminals of primary circuit 53 is converted to a phase variation between primary and secondary voltages P_v and S_v. This phase variation is detected by the detector circuit, as indicated by Fig. 1, so that there appears across output resistor 10 a voltage which is representative of the modulation of the incoming signal.

It is pointed out that the amplitude of the signal applied to transformer 52 is such that grids 12 and 13 are in their saturated or limiting condition. Since, as explained previously, the detector output voltage is representative of solely the phase variations of the voltages at grids 12 and 13, it follows that the detector will not be sensitive to amplitude variations of the signal of circuit 53. Accordingly, there is no need to utilize an amplitude limiter stage prior to the transformer 52. Furthermore, it is to be noted that the amplitude modulation is removed in the presence of frequency modulation, as well as in its absence. This follows from the fact that the voltage across output resistor 10 is a measure of solely phase differences between the input voltages applied to grids 12 and 13. Hence, the detector circuit in the case of Fig. 8 functions as a self-limiting balanced FM detector.

Experimental results have shown that the self-limiting action of the detector network of Fig. 1 is at least as effective as cascaded limiter stages. Another advantage is the improved linearity of the phase detection as compared to the conventional phase detector. Whereas a conventional phase detector provides linear detection for as much as ± 60 degrees, the present circuit can be made linear for as much as ± 80 degrees. This improves the linearity of the response that may be obtained from the type of FM detector in which a transformer (as in Fig. 8) is used to convert a frequency variation into a phase variation.

Figs. 9, 10, 11 show respectively different modifications of the invention. The frequency discriminator employed in these modifications is that shown in Fig. 8, while the triodes $T_1$, $T_2$ and $T_3$ are shown replaced by diodes to demonstrate that the functioning of the present detection system is independent of the specific construction of the clipper devices. In each of Figs. 9, 10 and 11 the circuits will be described in connection with the detection of FM signals.

In Fig. 9 the amplifier tube 60, whose input grid may be connnected to any source of FM signals, has its amplified output voltage applied through coupling condenser 62 and lead 62' to the anode 69 of diode $D_2$. Plate 60' of amplifier 60 is connected to the +B terminal of the direct current source (not shown) through inductive impedance 61. The amplifier 60 (which may be the I. F. amplifier of a superheterodyne receiver) does not limit, but has full and normal gain. It provides a high degree of signal voltage amplitude across impedance 61. The diode $D_1$ has its anode 68 connected to the high potential side of secondary circuit 65. The transformer 64 has its primary circuit 63 and secondary circuit 65 each tuned to a common frequency, and magnetically coupled to provide the type of response curve depicted in Fig. 8a.

In this way the secondary voltage will vary in phase relative to the primary voltage as explained in connection with Figs. 8a to 8d inclusive. The low potential sides of the circuits 63, 65 are connected in common to ground. Cathodes 70 and 71 of diodes $D_1$ and $D_2$ respectively are connected in common through unbypassed cathode resistor 74 and slider 76 to a desired point on potentiometer resistor 75. The ungrounded end of resistor 75 is connected to a point of negative direct current voltage of suitable value. Adjustment of slider 76 determines the initial negative bias applied to the cathodes of diodes $D_1$ and $D_2$.

The diodes $D_1$ and $D_2$, of course, correspond to triodes $T_1$ and $T_2$ respectively of Fig. 8. Instead of applying the secondary voltage $S_1$ to a grid of a triode (grid 12 of $T_1$), the voltage is applied to an anode of a diode rectifier (anode 68 of diode $D_1$). Similarly, the primary voltage $P_v$ is applied to anode 69 of diode $D_2$. Each of diodes $D_1$ and $D_2$ has a characteristic of the type illustrated by idealized curve D in Fig. 2. It is well known to those skilled in the art of radio communication that a diode rectifier can be given an "input voltage vs. output voltage" characteristic whose shape is substantially that of curve D of Fig. 2. For the case of diodes, the curves would be displaced so that the points $y$ and $y'$ coincided with the zero origin, and the curve D would all be in the positive abscissa and ordinate region, but the shape of the curves would be the same, and the same general theory applies. Tap, or slider, 76 is adjusted to provide a normal negative bias for each diode cathode such that on the negative half-cycles of the input wave the anodes 68 and 69 are swung negative relative to the respective cathodes 70 and 71. In other words, the diodes $D_1$ and $D_2$ are biased to points on their diode characteristics corresponding to $x$ of curve D (Fig. 2). It will be seen that the diodes $D_1$ and $D_2$ will in such case function as explained previously in connection with Fig. 2.

The voltage across cathode resistor 74 is applied to cathode 72 because the latter is connected directly to the cathode end of resistor 74. The anode 72' of diode $D_3$ is connected through output resistor 78 to the grounded end of potentiometer resistor 75. The diode $D_3$ functions in the manner explained in connection with triode $T_3$. In other words, the diode $D_3$ is normally biased by the adjustment of slider 76 so that diode $D_3$ has a normal operating point corresponding to point $x'$ of curve D' (Fig. 2). Accordingly, the output voltage across resistor 78 is represented by a square wave whose shape will depend on the phase relations between $P_v$ and $S_v$ applied to anodes 69 and 68 respectively.

The slider 76 is adapted to control the limiting points of the three diodes $D_1$, $D_2$, and $D_3$. The signal energy applied to primary circuit 63 will be such as to saturate the respective diodes. The resulting variable-mark square wave across output resistor 78 is integrated by means of resistor 77 and shunt condenser 79. That is, the average current through resistor 78 is caused to develop a voltage representative of the modulation applied to the carrier at the transmitter. With the integrating network 77, 79, there is a different resulting voltage on the elements of diode $D_3$ than there would be if resistor 77 were short-circuited. If resistor 77 is shorted out there is the possibility of a charge being built up on condenser 79, which places a permanent voltage on the plate 72' of the diode $D_3$ which must be compensated for by the voltage from potentiometer 75. With the integrating network as shown, resistor 77 isolates the condenser from the output resistor 78, so that the charge does not appear as a portion of the plate potential of diode $D_3$. Both types of operation are possible, but if resistor 77 is omitted the effect of the charge on the condenser 79 must be taken into account in the adjustment of the cathode, or plate, potential of diode $D_3$. Of course, the circuit of Fig. 9 may be used as explained in connection with Fig. 1. The detection of FM signals without using a special limiter stage is rendered relatively simple by this method.

The system of Fig. 10 is essentially the same as that shown in Fig. 9, except that a double diode-triode tube replaces the three diodes. The tube 80 has a common cathode 81 which provides separate electron streams to anodes 82, 83, and 84. Thus, diode $D_1$ is provided by cathode 81 and anode 83; diode $D_2$ is provided by cathode 81 and anode 82; diode $D_3$ is provided by cathode 81 and anode 84. The grid of the triode section is tied directly to anode or plate 84. Tube 80 may be of the 6SR7 or 6SQ7 types. The advantage of this arrangement is that a self-limiting FM detector using but a single tube structure is provided.

The modified circuit arrangement of Fig. 11 is different from the triple diode arrangement of Fig. 9 in that diodes $D_1$ and $D_2$ of the latter are replaced by the respective triodes $T_1$ and $T_2$. In that respect the tube 90 is similar to tube 3 of Fig. 1. However, the output device $D_3$ is a diode 99, as in the circuit of Fig. 9. The system shown in Fig. 11 has less overall gain than that shown in Fig. 1, but is easier to adjust for complete elimination of AM effects. The primary voltage $P_v$ across resonant circuit 63 is applied through coupling condenser 94 to grid 92 of triode $T_2$. The secondary voltage $S_v$ across circuit 65 is applied to grid 95 of triode $T_1$. Each of plates 91 and 96 of triodes $T_1$ and $T_2$ are established at positive potential, as in the circuit of Fig. 1. The common cathode connection 97 is made to the ungrounded end of cathode resistor 98. The latter is included in the space current path of diode 99 between cathode 101 and the grounded end of potentiometer 104.

Anode 100 of diode $D_3$ is connected through output resistor 102 to slider 103. The ungrounded end of potentiometer resistor 104 is established at a suitable positive potential. Hence, adjustment of slider 103 along resistor 104 provides a control over the limiting point of diode $D_3$. Normally the slider 103 is set so that the diode $D_3$ is conductive, but is close to cut-off (say point $x'$ of curve D' in Fig. 2). The magnitude of cathode resistor 98 is so chosen that the grids 92 and 95 have normal no-signal biases such that the characteristics of triodes $T_1$ and $T_3$ have normal operation points at $x$ of curve D (Fig. 2).

The output resistor 102 is shunted by condenser 105 to integrate the variable-mark square wave across the resistor. This is an alternative to the use of resistor 77 and condenser 79. It has been experimentally determined that when the condenser 105 is across the output resistor, a slightly different bias is required from potentiometer 103, 104 than would be required if the integration network 77, 79 were used. It will be understood that the diode $D_3$ could be embodied within the tube envelope 90 by locating anode 100 adjacent one of the two cathodes of the triodes. It will be understood that the circuits of Figs. 9, 10 and 11 function in the manner described in connection with Fig. 8. In each of these FM detectors there exists an inherent limiting action.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. In a radio communication system comprising at least two sources of high frequency waves of a common frequency, a pair of electron discharge devices each having at least a cathode, control grid and anode, a resistive impedance common to the space current paths of said devices connected from the cathodes of the devices to a point of relatively fixed potential, means for applying the waves from each source to a respective one of the grids with the waves applied to at least one grid being of saturation amplitude, a third electron discharge device including at least a cathode, control grid and anode, means connecting said impedance in the space current path of the third device between the cathode thereof and said point, means establishing the control grid of the third device at a fixed potential relative to its cathode, and an output resistive impedance in circuit with the third device anode.

2. In a radio communication system comprising at least two sources of high frequency waves of a common frequency, a pair of electron discharge devices each having at least a cathode, control grid and anode, a resistive impedance common to the space current paths of said devices connected from the cathodes of the devices to a point of relatively fixed potential, means for applying the waves from each source to a respective one of the control grids, said impedance having a magnitude such as to provide substantially cut-off grid bias for each of the devices, at least one of the sources of waves having a saturation amplitude, a third electron discharge device including at least a cathode, control grid and anode, means connecting said impedance in the space current path of the third device between the cathode thereof and said point, means establishing the control grid of the third device at a fixed potential relative to its cathode, and an output resistive impedance in circuit with the third device anode.

3. A method of producing a square wave whose shape is a function of the phase difference between two sine waves, comprising separately controlling the space current of each of two electron discharge devices by a respective one of said sine waves and with at least one of the sine waves at saturation amplitude, adding the space currents which flow in said two devices, and controlling the space current in a third electron discharge device in accordance with a resultant voltage derived from said added space currents.

4. In a signalling system, a source of angle modulated carrier waves, a source of unmodulated waves of the same carrier frequency, amplifier means comprising two electron discharge paths and a common cathode resistor, means for separately controlling said two paths by respective potentials derived from said sources, a self-limiting electronic means having an output impedance, and means responsive to the potentials developed across the common cathode resistor for controlling the space current of said electronic means.

5. In a signalling system, a pair of electron discharge devices having a common cathode resistor connected to ground, each of the devices having at least the usual electrodes of a triode, means for controlling the respective grids of the devices by signal potentials which are variably phase-related to each other and with at least one of the potentials of saturation amplitude, a third electron discharge device having a cathode, anode and control grid, means connecting the cathodes of the three devices to the ungrounded end of said resistor, means grounding the control grid of the third device, an output load in circuit with the anode of the third device, and said third device and at least one of said pair of devices being biased to function as wave clipper devices.

6. In combination with a source of frequency modulated signals, a transformer having liketuned primary and secondary circuits, said primary circuit being coupled to the source, a pair of electron discharge devices having respective input connections to the primary and secondary circuits, an output resistor common to the space current paths of said pair of electron discharge devices, a third electron discharge device having an input connection to said resistor and an output circuit, said resistor being located in the space current path of the third device, each of said devices including a control electrode, circuit connections from each control electrode to a common point on said resistor, each of said three devices being a half wave clipper, and a second output resistor in the output circuit of the third device for providing a square wave whose shape is a function of the frequency modulation of the signals at said source.

7. In a detector, three electron discharge devices having a common cathode resistor whereby they are cathode coupled, a pair of separate signal input connections to two of said devices, the signals being of like frequency, at least one of the input connections applying a saturating signal to its respective one of the two devices, the third device having a characteristic such that it is saturated on positive half-cycles of signal voltage across said common resistor, and means for deriving from the space current of the third device a wave whose shape is dependent on the relations between the signals at the input connections.

8. A method of detecting signal modulated carrier waves which includes the steps of deriving from the waves a pair of signal voltages whose frequency is equal to the carrier frequency and which have a predetermined phase relation, separately amplifying the pair of signal voltages, clipping at least one of said voltages on the negative half-cycles thereof during said amplification, combining additively the amplified voltages to produce a resultant voltage wave, amplifying the resultant voltage, clipping the resultant voltage wave on the positive half-cycles thereof during said last amplification thereby to provide a square wave whose shape is a function of a variation in a predetermined characteristic of said modulated carrier waves, and deriving from said square wave a voltage representative of the signal modulation.

9. A detector of modulated carrier waves comprising a first self-limiting electronic device, means feeding solely the carrier component of the waves to said first device, a second electronic device, means applying the modulated carrier waves to said second device, self-limiting means adding the output waves of the two devices to form a resultant wave which is of square wave form on one half cycle but has a degree of half-wave dissymmetry proportional to the modulation component of the modulated wave, and means for translating the dissymmetry of said resultant wave into an output signal corresponding to the modulation on said modulated wave.

10. A method of producing a wave whose shape is a function of the phase difference between two waves of a common frequency, comprising separately controlling the space current of each of two electron discharge devices by a respective one of said two waves, adding the space currents which flow in said two devices to provide a single resultant voltage, and controlling the space current in a third electron discharge device and limiting in said space current of a predetermined polarity in accordance with said resultant voltage derived from said added space currents.

11. In a signalling system, a source of phase modulated carrier waves, a source of unmodulated waves of the same carrier frequency, two electron discharge devices having a common cathode resistor, means for separately controlling the two space current paths of said devices by respective potentials derived from said sources, an electronic discharge means having an output resistor, and means responsive to the potentials developed across the common cathode resistor for controlling the space current of said last electronic means.

12. A method of producing a square wave whose shape is a function of the phase difference between two sinusoidal input waves, comprising separately controlling the space current flow of each of two triode devices by a respective one of said input waves, maintaining at least one of the input waves at saturation amplitude, adding the space currents which flow in said two triodes, and controlling the space current flow in a third triode device and limiting said space current flow of a predetermined polarity in accordance with a resultant voltage derived from said added space currents.

13. In a signalling system, a source of frequency modulated carrier waves, a source of frequency modulated waves of the same carrier frequency but shifted in phase, a pair of diodes having a common cathode resistor, means for separately controlling the space current paths of the diodes by respective potentials derived from said sources, an electronic device having an output resistor, and means responsive to solely the voltage across the common cathode resistor for controlling the space current of said electronic device.

14. In a detector, three diodes having a common cathode resistor, a pair of separate signal input connections to two of said diodes, the signals being of like frequency, at least one of the input connections applying a saturating signal to its respective one of the two diodes, the third diode having a characteristic such that it is saturated on positive half-cycles of signal voltage across said common resistor, and means for deriving from the space current of the third diode a wave whose shape is dependent on the relations between the signals at the input connections.

15. A method of detecting frequency modulated carrier waves which includes the steps of deriving from the waves a pair of signal voltages whose frequency is equal to the carrier frequency and which have a normal phase quadrature relation, separately amplifying the pair of signal voltages, clipping at least one of said voltages on the negative half-cycles thereof during said amplification, combining additively the amplified voltages to produce a resultant voltage wave, amplifying the resultant voltage, clipping the resultant voltage wave on the positive half-cycles thereof during said last amplification thereby to provide a wave whose shape is a function of frequency variation of said modulated carrier waves, and deriving from said wave a voltage representative of the frequency modulation.

16. In a frequency modulation detector, three electron discharge devices having a common cathode resistor whereby they are cathode coupled, a pair of separate frequency modulation signal input connections to two of said devices, the signals being of like frequency, said two devices being triodes, at least one of the input connections applying a saturating signal to its respective one of the two triode devices, the third device being a diode and having a characteristic such that it is saturated on positive half-cycles of signal voltage across said common resistor, and means for deriving from the space current of the third device a wave whose shape is dependent on the relations between the signals at the input connections.

17. In a system for detecting angle modulated carrier waves, means deriving from the waves a pair of voltages whose frequency is equal to the carrier frequency and which have a normal phase quadrature relation, means for clipping at least one of said voltages on the negative half-cycles thereof, means for combining additively the clipped and unclipped voltages to produce a resultant voltage, means for clipping the resultant voltage wave on the positive half-cycles thereof thereby to provide a square wave whose shape is a function of variation in angle modulation of said carrier waves, and means for deriving from said square wave a voltage representative of the angle modulation.

MURRAY G. CROSBY.

REFERENCES CITED

The following references are of record in the file of this patent:

UNITED STATES PATENTS

| Number | Name | Date |
|---|---|---|
| 2,063,588 | Crosby | Dec. 8, 1936 |
| 2,183,399 | Heising | Dec. 12, 1939 |
| 2,226,459 | Bingley | Dec. 24, 1940 |
| 2,351,240 | Trevor | June 13, 1944 |